United States Patent [19]
Kapich

[11] Patent Number: 5,904,045
[45] Date of Patent: *May 18, 1999

[54] HYDROPNEUMATIC ENGINE SUPERCHARGER SYSTEM

[76] Inventor: Davorin D. Kapich, 3111 Serrano Dr., Carlsbad, Calif. 92009

[ * ] Notice: This patent is subject to a terminal disclaimer.

[21] Appl. No.: 08/700,689

[22] Filed: Aug. 12, 1996

Related U.S. Application Data

[63] Continuation-in-part of application No. 08/526,593, Sep. 11, 1995, Pat. No. 5,577,385.

[51] Int. Cl.⁶ .................................................... F02B 37/04
[52] U.S. Cl. ............................... 60/609; 60/612; 123/565
[58] Field of Search ..................... 60/609, 612; 123/565

[56] References Cited

U.S. PATENT DOCUMENTS

| | | | |
|---|---|---|---|
| 2,877,622 | 3/1959 | Antonissen | 60/612 |
| 4,610,235 | 9/1986 | Grunig | 123/565 |
| 5,207,063 | 5/1993 | Blake | 60/612 |
| 5,577,385 | 11/1996 | Kapich | 60/612 |

Primary Examiner—Michael Koczo
Attorney, Agent, or Firm—John R. Ross; John R. Ross, III

[57] ABSTRACT

An hydropneumatic supercharger system for charging air into an internal combustion engine. An hydropneumatic supercharger is driven by an hydraulic turbine and an air turbine. The supercharger compressor provides supercharger air to a turbocharger. The turbocharger is driven by exhaust gasses from the engine and the turbocharger compressor provides compressed air to the engine and also provides compressed air to drive the supercharger air turbine.

9 Claims, 6 Drawing Sheets

HYDROPNEUMATIC ENGINE SUPERCHARGER SYSTEM

This invention relates to internal combustion engine equipment and especially to superchargers for such engines. This application is a continuation-in-part of Ser. No. 08/528,593 filed Sep. 11, 1995, U.S. Pat. No. 5,577,385.

BACKGROUND OF THE INVENTION

Now stringent diesel emission regulations have had the effect of limiting the acceleration rates of turbodiesel powered vehicles. A need for supercharging of turbodiesel engines to improve their performance in the low RPM range has been recognized by most turbodiesel engine manufacturers and users. Positive displacement superchargers, such as well known Roots type and rotary type blowers driven directly by the engine via speed increasing gear trains have been utilized by major turbodiesel manufacturers. Fixed gear ratio mechanical superchargers suffer from four vary undesirable features which are:

1) supercharger speed cannot practically be controlled independently of engine speed,
2) a fixed gear ratio mechanical supercharger proportions the engine intake air flow closely to the engine speed regardless of the engine load, thus the supercharger is not able to achieve the optimum air flow to fuel ratio at all engine loads,
3) a mechanical clutch is required to disconnect the blower from the engine when not needed which result in an abrupt change in boost, and
4) the positive displacement blower blocks the air flow through it when disconnected from the engine.

The applicant has been granted U.S. Pat. No. 5,421,310 issued on Jun. 6, 1995 for a hydraulic supercharging system utilizing a miniature, very high speed hydraulic turbine driving a compact centrifugal compressor to supercharge a turbocharged engine. The advantage of this system is its ability to modulate the supercharger speed independently of the engine speed and thus achieve substantially optimum boost and air/fuel ratio at all engine loads and speeds. It utilizes a "stand alone" relatively simple hydraulic system incorporating prior art bearings lubrication and seals functions. This hydraulic supercharging system does, however, require a substantial amount of engine mechanical power to drive the hydraulic system which may be undesirable is some applications. Applicant has also been granted U.S. Pat. No. 5,427,508 issued Jun. 27, 1995 for an electro-pneumatic blower and U.S. Pat. No. 5,346,364 issued on Sep. 13, 1994 and U.S. Pat. No. 5,471,965 issued on Jun. 27, 1995 disclosing high speed hydraulic turbines. The teachings of all the patents referred to in this paragraph are hereby incorporated herein by reference.

What is needed is an engine supercharging system which provide the advantages of the hydraulic system with a substantial reduction in the power required from the engine to drive the hydraulic system.

SUMMARY OF THE INVENTION

The present invention provides an hydropneumatic supercharger system for charging air into an internal combustion engine. An hydropneumatic supercharger is driven by a hydraulic turbine and an air turbine. The supercharger compressor provides supercharger air to a turbocharger. The turbocharger is driven by exhaust gasses from the engine and the turbocharger compressor provides compressed air to the engine and also provides compressed air to drive the supercharger air turbine. Preferably, the larger portion of air discharging from the turbocharger compressor is conventionally intercooled and is then supplied to the engine intake manifold. Under certain low engine RPM conditions up to $\frac{1}{3}$ of the total turbocharger compressor air flow is supplied to the air turbine which in combination with a high speed hydraulic turbine is driving the supercharger blower. Preferably, a control valve in the air turbine supply line controls the amount of flow admitted to the air turbine from the turbocharger compressor discharge. In the low engine RPM range when the engine suffers from a lack of power, the hydraulic turbine initially provides most of the power needed to accelerate the supercharger which in turn increases the boost into the inlet of the turbocharger compressor and further on exponentially into the engine air box. This allows for more fuel to be combusted, which in turn increases sharply the turbocharger turbine output which drives the turbocharger compressor. The engine thermodynamic cycle analysis shows that a substantial amount of the compressor discharge air flow can be diverted a this point into the air turbine driving the blower, which in turn lowers the mechanical power consumption required to drive the hydraulic system. The turbocharger power balance analysis shows additional increase in the pressure drop across the engine with the hydropneumatic supercharging which generally has a very positive effect on the efficiency of air scavenging into the engine cylinders. In a preferred embodiment for charging a 4 Liter turbodiesel engine, the engine net power at 1300 RPM increases by the hydropneumatic supercharger action to 105 HP, as compared to 60 HP for turbocharged engine only. In this preferred embodiment a 2 horsepower high speed hydraulic turbine is used in conjunction with a 5 horsepower radial inflow impulse air turbine mounted an the common shaft and operating at 47,000 RPM. The blower and the turbine blades may be solidly attached to an integral wheel with 3.4 inch diameter in a manner similar to the design shown in the U.S. Pat. No. 5,427,508 issued on Jun. 7, 1995 which as stated above is hereby incorporated herein by reference.

DETAILED DESCRIPTION OF THE PREFERRED EMBODIMENT

Hydropneumatic Engine Supercharging System

Figure 1:
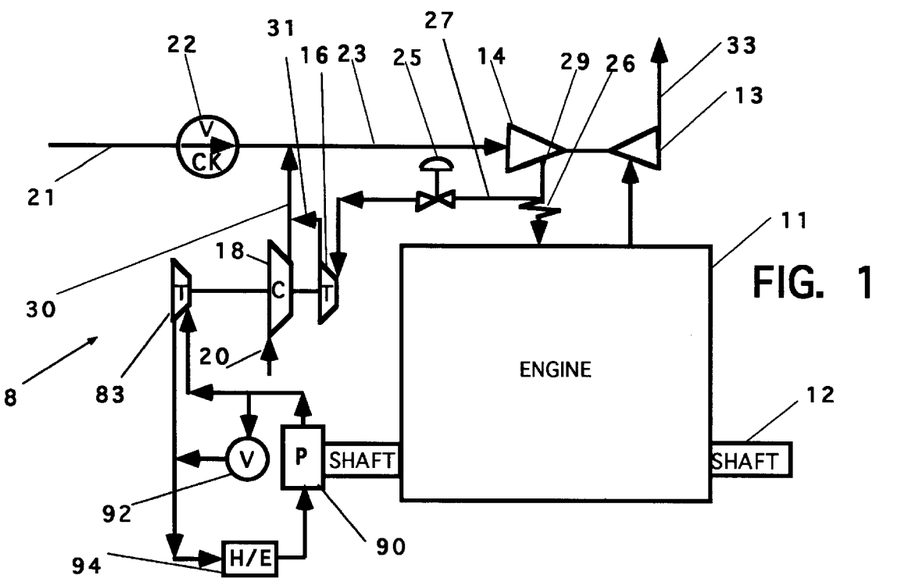
FIG. 1 shows a layout of the hydropneumatic supercharging system according to the present invention.

FIG. 1 shows a preferred embodiment of the present invention. Engine 11 is a standard 4 liter diesel engine producing useful mechanical power via drive shaft 12. Ambient air needed for combustion is supplied via inlet line 20 into the supercharger compressor 18 of supercharger 8 which is driven by hydraulic turbine 83 or air turbine 16 or both. The compressed air produced in supercharger compressor 18 is further transported via supercharger compressor discharge line 30 and supply line 23 into the turbocharger compressor 14, where it undergoes a second stage compression and is discharged via pipe 29 and air intercooler 26 and then into the engine 11. Following a conventional combustion process inside engine 11, the engine 11 exhausts gases at higher than ambient pressure and temperature are led into the turbocharger turbine 13 producing useful work in the turbocharger turbine 13 which drives directly the turbocharger compressor 14. The turbocharger turbine 13 exhausts into the ambient via exhaust pipe 33.

Air line 21 and check valve 22 allow under certain operating conditions for portion of the engine air to bypass the supercharger compressor 18 when the air pressure in the supply line 23 falls below the ambient pressure. When supercharger compressor 18 is producing pressure rise the check valve 22 shuts off automatically preventing the air flow to reverse through the air line 21. A portion of the compressed air discharged from the turbocharger compressor 14 is, under certain engine operating conditions, supplied to the air turbine 16 via compressed air line 27 and flow control valve 25. After performing useful work in the air turbine 16 the air flow is returned to the supercharger compressor discharge line 30 via air line 31. The power supplied by the air turbine 16 is augmented by the hydraulic turbine 83 driving the supercharger compressor 18 by a common shaft. Hydraulic turbine 83 is in turn driven by high pressure hydraulic fluid supplied by pump 90 driven by the engine shaft. Control is provided by operation of bypass valve 92 as further explained in U.S. Pat. No. 5,421,310. Hydraulic fluid is cooled by heat exchanger 94.

Operation in the Low Engine RPM Range.

At low engine RPM, assistance of supercharger compressor 18 is required to increase the air pressure into the inlet of the turbocharger compressor 14, which substantially increases the charge air pressure into the engine 11 due to the two stage compression. Initially, the flows control valve 25 is closed and hydraulic turbine 83 is providing all the power to the supercharger compressor 18. Sudden increase in the air flow density into the engine allows for a proportional increase of the fuel flow into the engine, resulting in almost immediate increase in engine power. Almost immediately, the pressure ratio and the energy content of the engine exhaust gas flow is greatly increased due to the two stage compression and increased fuel combustion. This provides the turbocharger turbine 13 with an excess power over that required by the turbocharger compressor 14 and allows for the flow control valve 25 to open admitting the surplus compressed air into the air turbine 16. The power generated by the air turbine 16 allows for a substantially reduced power required from the hydraulic turbine 83, thus essentially "bootstrapping" the overall supercharging/turbocharging system to the increased power of the turbocharger turbine 13. The air flow through the turbocharger compressor 14 increases substantially over the air flow admitted to the engine 11 due to the amount of the air flow being recirculated through the air turbine 16. This has a very beneficial effect on the efficiency and flow stability of the turbocharger compressor 14 due to increased surge margin, which is well known requirement of a typical centrifugal flow turbocharger compressor operating in the low engine RPM range.

Operation in the Intermediate and High Engine RPM Range

Increased engine RPM produces higher and higher energy content available to the turbocharger turbine 13 and the need for supercharging the inlet of the turbocharger compressor 14 decreases. The hydraulic power supplied to the hydraulic turbine 83 is decreased greatly; therefore, permitting the engine to produce more useful net power and increasing engine overall efficiency.

System Parameters For a Typical 4 Liter Turbo Diesel

A thermodynamic analysis of the engine power cycle indicates that the use of the present invention will increase the net power output of a commercially available 4 Liter turbodiesel by 80% at 1200 RPM, 70% at 1500 RPM, 50% at 1700 RPM. When the engine reaches 2400 RPM the turbocharger alone is sufficient to produce required power. The power ratings could be increased further over the entire engine RPM range if additional increase in the engine cylinder maximum gas pressures can be achieved. For this preferred embodiment, the supercharger compressor 18 and the air turbine 16 are of integral aluminum construction with a common wheel diameter of 3.4 inch. A preferred hydraulic turbine (at 5 HP and 50,000 RPM) is described in detail in U.S. Pat. No. 5,471,965, issued Dec. 5, 1995, which, as stated above, is incorporated by reference herein. Such a unit is also commercially available, from Kapich Engineering with offices in Carlsbad, Calif.

The following table shows some of the key engine parameters at different engine speeds. Values shown in parentheses are equivalent values for a turbocharged diesel engine with no supercharging. Note especially, the effects of the supercharger on engine horsepower and turbocharger turbine power:

| | | | | |
|---|---|---|---|---|
| Engine Speed (RPM) | 1300 | 1500 | 2200 | 3800 |
| Engine Power (HP) | 105 (55) | 120 (75) | 160 (150) | 230 (230) |
| Supercharger Press. Ratio | 1.35 (1.0) | 1.3 (1.0) | 1.1 (1.0) | 1.0 (1.0) |
| Turboch. Compr. Press. Ratio | 1.87 (1.19) | 2.02 (1.48) | 2.38 (2.2) | 2.04 (2.04) |
| Engine Air Flow (lb/min) | 14.76 (7.1) | 16.87 (9.5) | 22.5 (21) | 32.4 (32.4) |
| Turbo. Compr. Air Flow (lb/min) | 23.6 (7.1) | 25.5 (9.5) | 29.0 (21) | 32.4 (32.4) |
| Air Turbine Air Flow (lb/min) | 8.85 | 8.6 | 6.5 | 0 |
| Air Turbine Power (HP) | 4.35 | 4.3 | 1.9 | 0 |
| Hydraulic Turbine Power (HP) | 1.3 | 1.3 | 0.75 | 0 |
| Engine Exhaust Temp. (deg. F.) | 1100 | 1100 | 1100 | 1100 |
| Engine Press. Diff. (psid) | 4.2 (1.0) | 3.5 (1.7) | 2.0 (2.0) | 2.0 (2.0) |
| Turboch. Turbine Power (HP) | 21.6 (1.5) | 25.0 (4.7) | 29.7 (25.2) | 30.1 (30.1) |

Alternate System Configurations

Check valve 22 and inlet pipe 21 could be left off. In this case the supercharger compressor 18 is designed to handle the entire engine 11 air flow at all engine 11 operating conditions. Flow control valve 25 could also be left about allowing for unrestricted air flow from the turbocharger compressor 14 into the air turbine.

Figure 2:
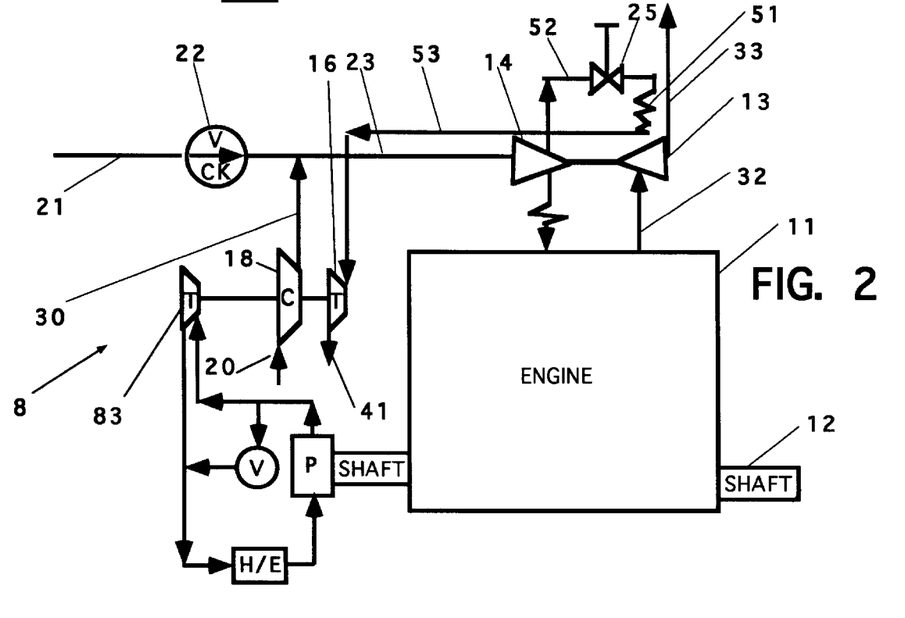
FIGS. 2, 3 and 4 show modified versions of the layout shown in FIG. 1.
Figure 3:
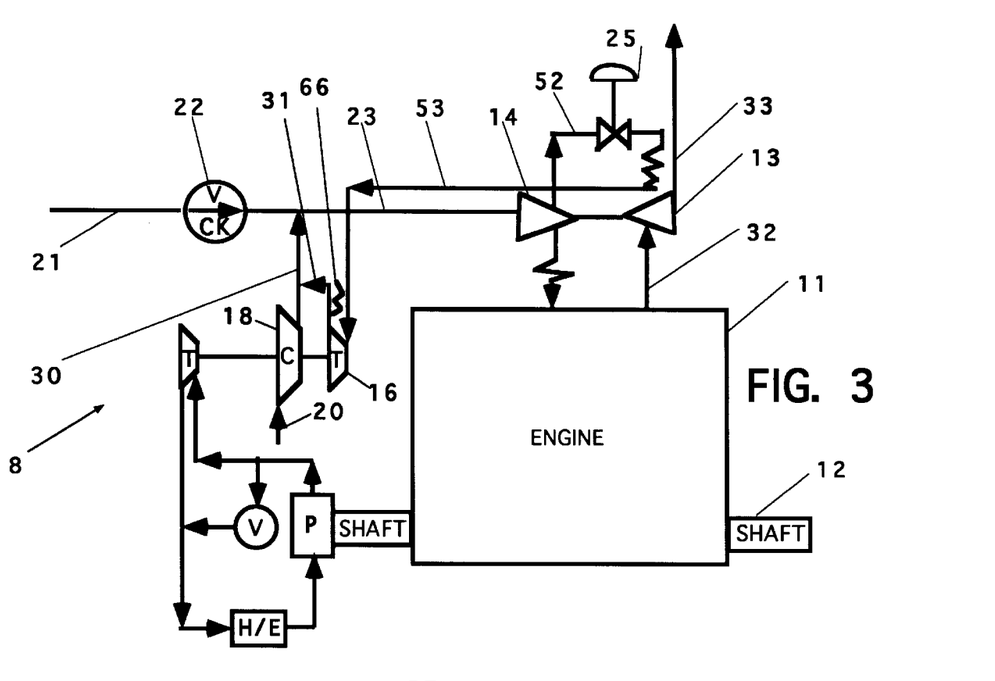
Figure 4:
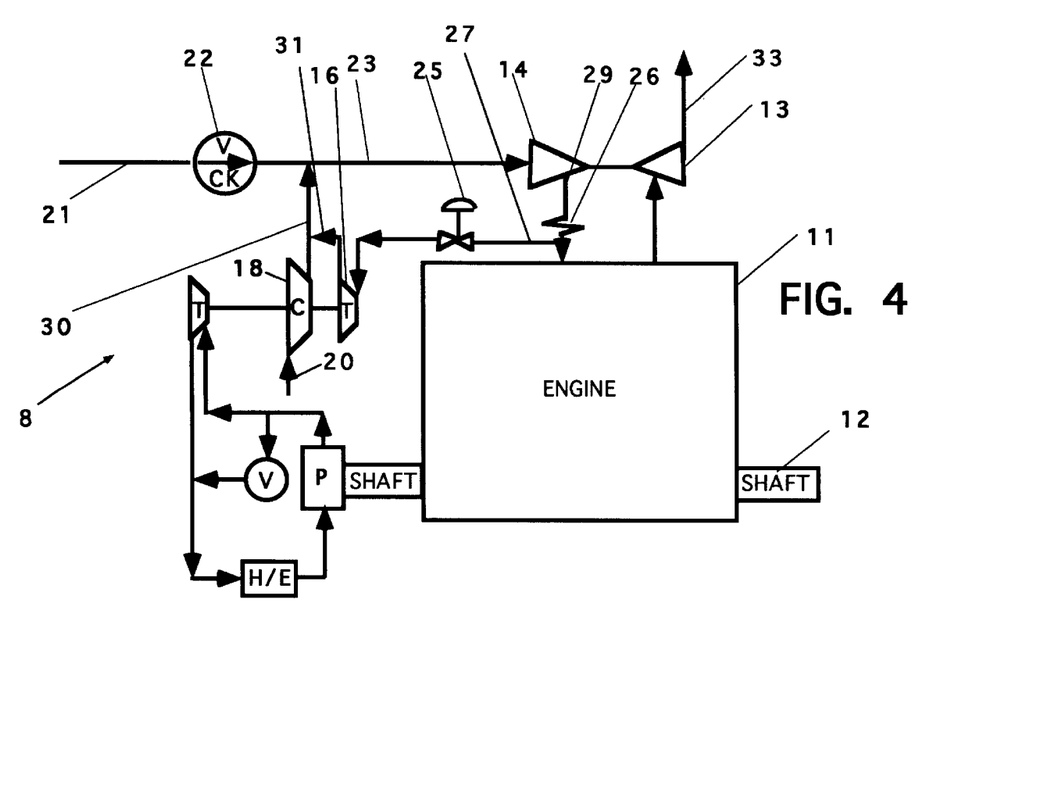

FIG. 2 shows FIG. 1 basic configuration except for the air turbine 16 air flow being heated in the heat exchanger 51 by the turbocharger turbine 13 exhaust gas flow for purpose of increasing the energy content of air driving the air turbine 16 which exhausts the air into the ambient via pipe 41. FIG. 3 shows the FIG. 2 basic configuration except for the addition of the air producer 66 cooling the air flow exiting air turbine 16 and the elimination off pipe 41. FIG. 4 shows the FIG. 1 basic configuration except the compressed air lane 27 is positioned downstream of air intercooler 26.

Hydropneumatic Supercharger Designs

Supercharger Air Turbine and Compressor Exhausts Mixed

Figure 5:
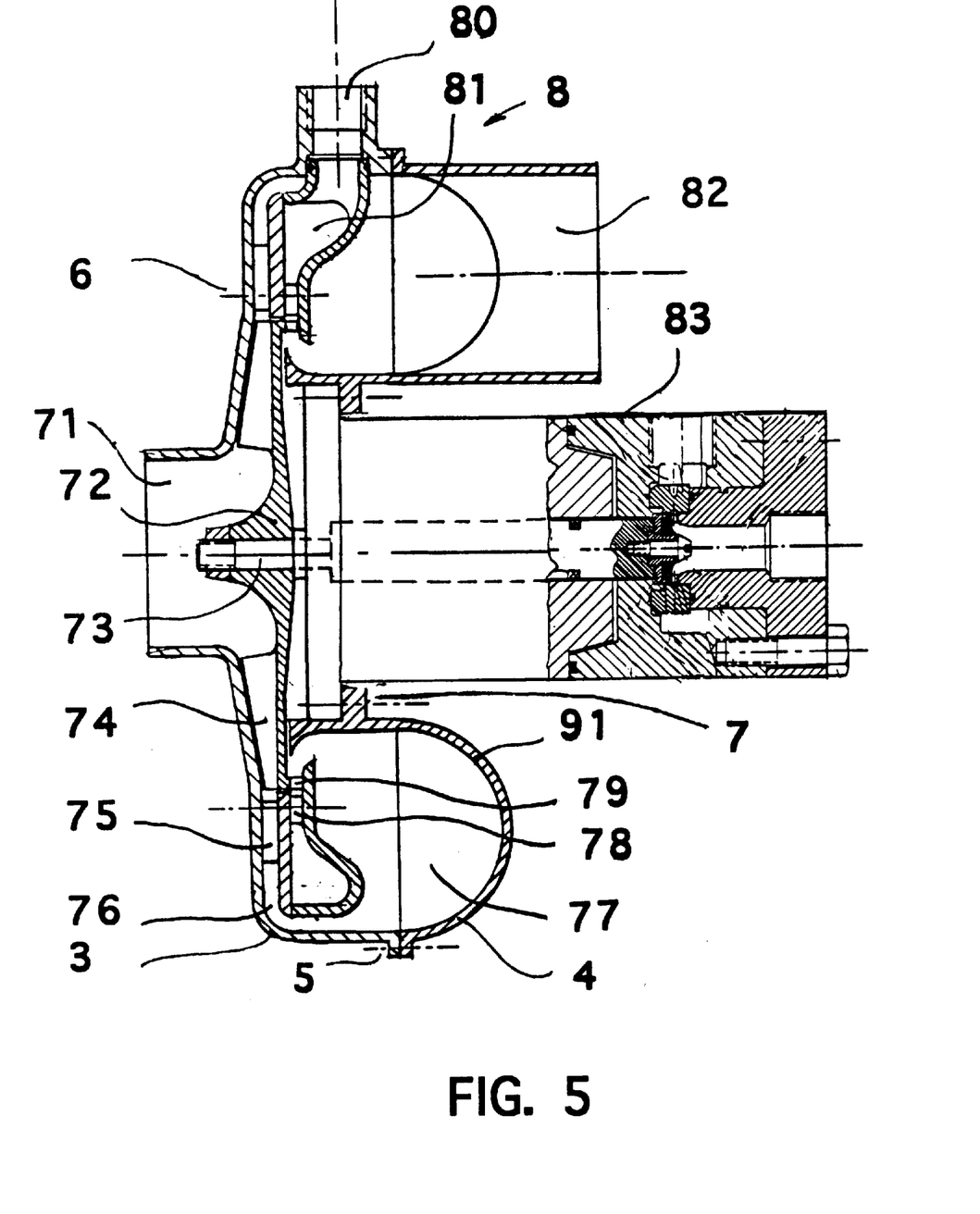
FIGS. 5, 6, 7 and 8 show preferred hydropneumatic supercharger designs.

FIG. 5 shows an embodiment of an hydropneumatic supercharger 8 that is preferred for the hydropneumatic supercharger systems shown in FIGS. 1 and 3. Hydraulic turbine 83 is a 5 HP 50,000 RPM radial inflow turbine described in detail in U.S. Pat. No. 5,471,965. It is also available from Kapich Engineering, Carlsbad, Calif. Supercharger 8 comprises a housing 91, comprising a generally toroidal shaped exhaust duct 77 with a 2½ inch diameter exhaust pipe 82 and inlet pips 71. Inlet pips 71 in FIG. 6 connects to inlet line 20 shown in FIGS. 1 and 3. Exhaust pipe 82 in FIG. 6 connects to discharge line 30 shown in FIGS. 1 and 3. Air line 31 shown in FIGS. 1 and 3 is contained internally lo toroidal housing 91 discharging air from the turbine rotor blades 79 directly into exhaust duct 77 where it mixes freely with compressor exhaust flow discharging into exhaust duct 77 via diffuser exhaust passage 76. Housing 91 is divided into a front part 3 and a back part 4 and is joined by bolts at location 5. Hydraulic turbine 83 is attached to housing 91 with multiple bolts as shown at 7. Supercharger compressor-turbine wheel 72 is mounted on the ¼ inch diameter external extension of hydraulic turbine shaft 73. Wheel 72 is preferably cast in a single aluminum cast and has a diameter of 3.4 inches. It comprises 16 compressor blades 74 and 82 turbine blades 79. Turbine blades 79 are intentionally made small in order to minimize turbine windage losses when the supercharger is driven by the hydraulic turbine. Compressed air flow driving turbine blades 79 enters through ¾ inch diameter turbine inlet channel 80 into the turbine volute 81 flowing further on into nozzle passages formed by 16 nozzle vanes 78 positioned at 15 degree relative to the tangent of the turbine blades 79 circle where it expands and gains kinetic energy and drives turbine blades 79 by well known principals governing the operation of impulse turbines. Turbine blades 79 height is 0.20 inch and is based on the optimum efficiency design correlation for such full admission radial inflow impulse turbine. The four machine screws at location 6 are threaded into nozzle vanes 78 and passing through compressor diffuser vanes 75 firmly attach turbine inlet volute 81 to the front part of part 3. Turbine inlet channel 80 is connected flow-wise to air line 27 in FIGS. 1 and 4 and to air line 53 in FIGS. 2 and 3.

TurbineExhaust Discharged

Figure 6:
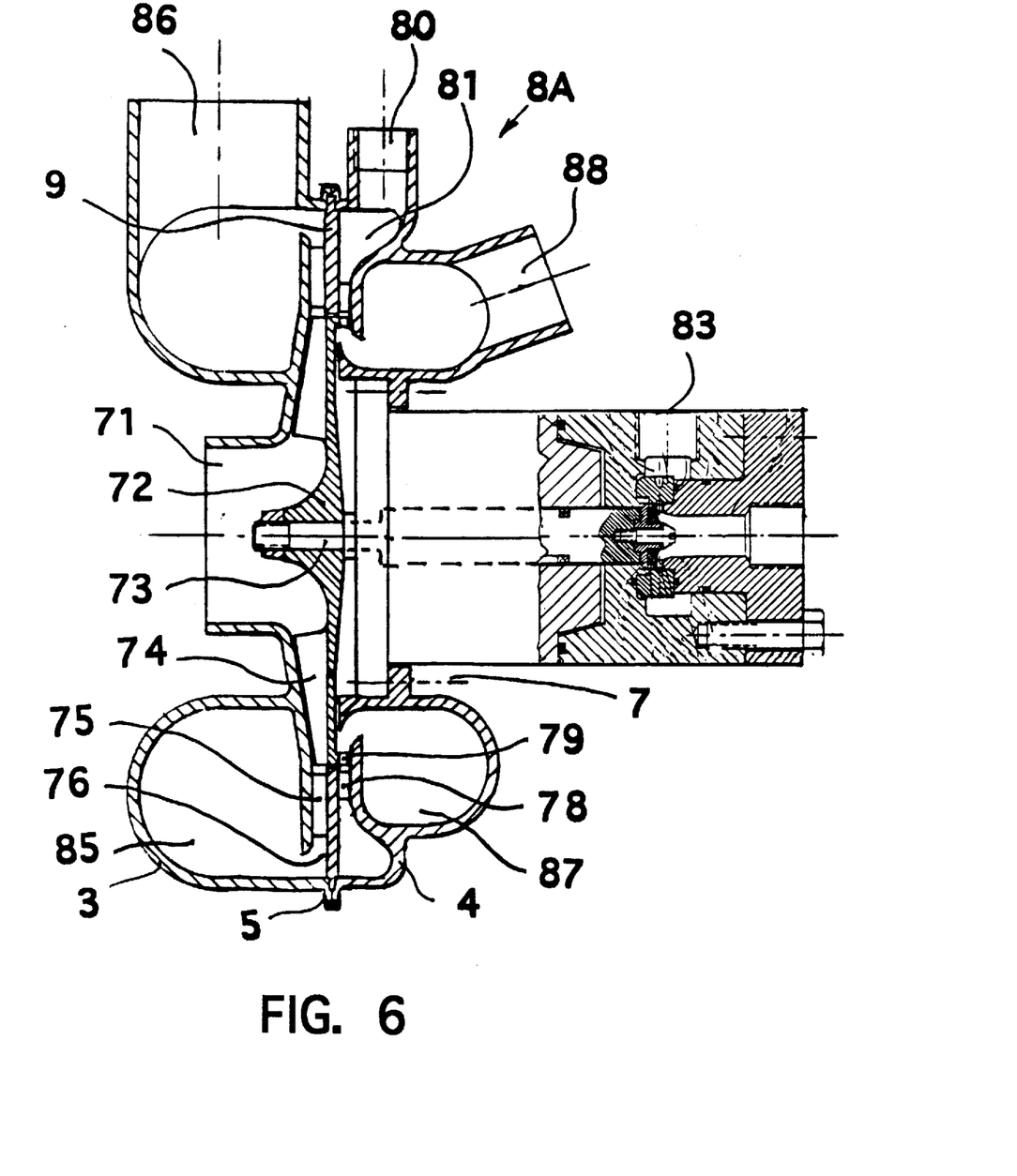

FIG. 6 shows a preferred embodiment a hydropneumatic supercharger 8A applicable to the systems shown in FIG. 2. The FIG. 6 design is very similar to the FIG. 5 design except the turbine exhaust flow and the compressor exhaust flow are not mixed. The turbine exhausts through turbine exhaust passage 88 and into line 41 as shown on FIG. 2 and the compressor discharges through the compressor exhaust passage 86. The front part 3 and the back part 4 are held solidly together with a commercial "V" band clamp as shown at 5. Radial parts 9 with integral nozzle vanes 78 and diffuser vanes 75 is clamped in between front part 3 and back part 4, thus eliminating the need for the machine screws attachment at the location 6 in FIG. 5.

Axial Flow Compressor

Figure 7:
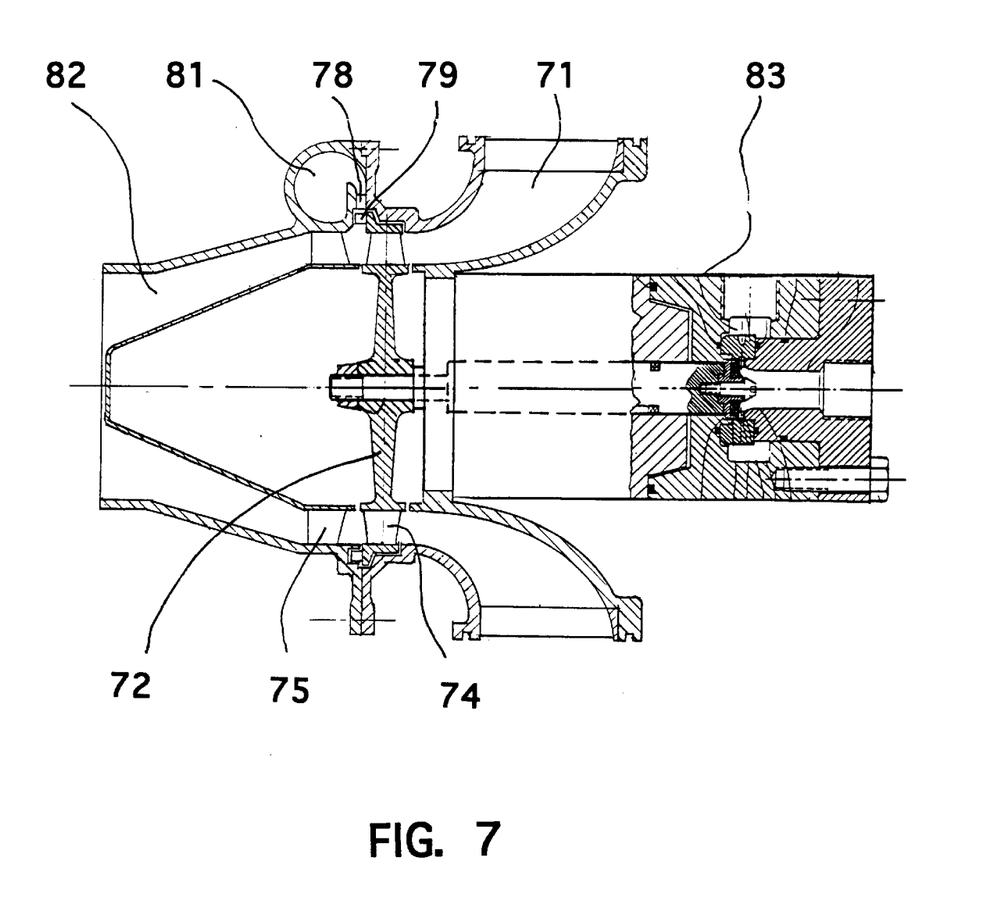

FIG. 7 shows a preferred embodiment with a hydropneumatic supercharger 88 applicable to hydropneumatic supercharger system shown in FIGS. 1, 3 and 4, but preferring axial flow supercharger compressor blades, with turbine blades 79 mounted integrally on the rim of the axial flow supercharger blades 74. Axial flow supercharger blades are generally preferred for large air flow capacities required by larger engines. Ambient air enters the supercharger through air passage 71. Compressor-turbine wheel 72 is driven by hydraulic turbine 83 as described above and also by compressed air entering plenum 81 from pips 27 or 53 and being directed by vanes 78 on to turbine blades 79. Compressed air is discharged through passage 82 into pipe 30 as shown on FIGS. 1, 3 and 4.

Turbocharger-Supercharger Integrated Design

Figure 8:
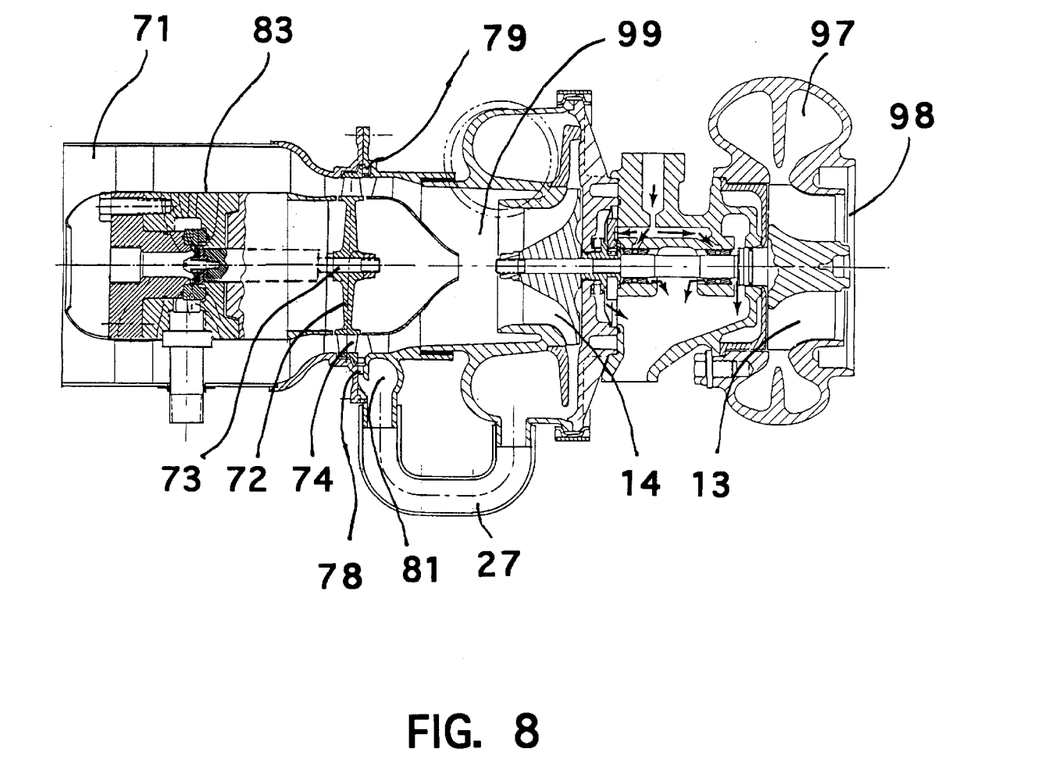

FIG. 8 shows a compact turbocharger-supercharger integrated design in which both the turbocharger and the hydropneumatic supercharger is assembled as a combined unit. Engine exhaust gasses pass into turbocharger turbine volute 97 through an engine exhaust pipe (not shown) and exit the turbine through exhaust 98. Turbocharger turbine 13 drives turbocharger compressor 14. Ambient air enters the supercharger through inlet 71 from pips 20 (shown on FIGS. 1, 3 and 4) and compressed air output of supercharger compressor is fed directly into the intake of turbocharger compressor 14 through channel 99 (shown in FIG. 8) corresponding to pipes 30 and 23 in FIGS. 1, 3 and 4. The output of turbocharger compressor 14 is directed through pips 27 into turbine volute 81 flowing further by vanes 78 to drive supercharger turbine blades 79 (as shown in more detail in a FIG. 7) helping to drive the supercharger compressor wheal 72. The output of turbocharger compressor is also directed into engine 11 as explained above through a pips shown in phantom on FIG. 8. As explained above, supercharger compressor wheel 72 is also driven by hydraulic turbine 83 as shown in FIG. 8, but in more detail in FIG. 7. Arrows in the turbocharger portion of FIG. 8 show lubricating oil flow in the turbocharger. The turbocharger portion of the device shown in FIG. 8 is a commercially available turbocharger, Model No. TO-4 manufactured by Allied Signal, Automotive Group with offices in Torrence, Calif.

Flow Requirements

The supercharging air flow requirements of the present invention are similar to those established for a hydraulic supercharging system patented by Applicant in U.S. Pat. No. 5,421,310 issued Jun. 6, 1995 with the exception that the pneumatic power has been applied in a combined fashion with the hydraulic power supply to drive the supercharger. Adding to pneumatic power to the hydraulic power actually reduces the overall system costs by approximately 30 percent, due to much reduced hydraulic power requirements.

Although the above description contains many specificities, those should not be construed as limiting the scope of the invention but as merely providing illustrations of some of the presently preferred embodiments of this invention. For example, a great variety of engines would benefit from such a supercharging system. The sizes of the individual items within the system should be chosen to provide the desired service. Thus, the scope of the invention should be determined by the appended claims and their legal equivalent, rather than by the examples given.

I claim:

1. An hydropneumatic supercharger system for charging air into an internal combustion engine, said system comprising:

A) an hydropneumatic super charger comprising a first air compressor on a shaft driven by a hydraulic turbine and by a compressed air turbine, B) a turbocharger comprising a second air compressor providing compressed air to said engine and to said air turbine, said second air compressor being driven by an exhaust gas turbine driven by exhaust gasses from said engine;

said first air compressor providing compressed air to said second air compressor for further compression by said second air compressor.

2. An hydropneumatic supercharger system as in claim 1 and further comprising a hydraulic fluid pump for providing hydraulic fluid to drive said hydraulic turbine.

3. An hydropneumatic supercharger system as in claim 1 and further comprising a valve means for controlling the compressed air flow from said second air compressor to said air turbine.

4. An hydropneumatic supercharger system as in claim 1 and further comprising a heat exchanger means for heating with engine exhaust gasses the compressed air flow from said second air compressor to said air turbine.

5. An hydropneumatic supercharger system as in claim 1 wherein air discharged from said air turbine is discharged into said second air compressor.

6. An hydropneumatic supercharger system as in claim 5 and further comprising an air turbine exhaust means to permit said air turbine to exhaust into ambient air.

7. An hydropneumatic supercharger system as in claim 1 wherein said first air compressor is a centrifugal flow compressor.

8. An hydropneumatic supercharger system as in claim 1 wherein said first air compressor is an axial flow compressor.

9. An hydropneumatic supercharger system as in claim 1 wherein said supercharger and said turbocharger are assembled as a combined unit.

\* \* \* \* \*